United States Patent
Gaida et al.

(10) Patent No.: US 7,400,342 B2
(45) Date of Patent: Jul. 15, 2008

(54) OPTICAL OBSERVATION APPARATUS WITH VIDEO DEVICE

(75) Inventors: Gerhard Gaida, Aalen (DE); Dieter Quendt, Esslingen (DE); Dirk Brunner, Aalen (DE); Ralf Benninger, Oberkochen (DE); Ludwin Monz, Mainz (DE); Michael Haisch, Aalen (DE)

(73) Assignee: Carl-Zeiss-Stiftung (DE)

( * ) Notice: Subject to any disclaimer, the term of this patent is extended or adjusted under 35 U.S.C. 154(b) by 810 days.

(21) Appl. No.: 10/719,855

(22) Filed: Nov. 21, 2003

(65) Prior Publication Data

US 2004/0104998 A1 Jun. 3, 2004

(30) Foreign Application Priority Data

Nov. 25, 2002 (DE) ................. 102 55 460

(51) Int. Cl.
H04N 7/18 (2006.01)
(52) U.S. Cl. ......................... 348/77; 348/79
(58) Field of Classification Search ............. 348/40–90; 34/42–88
See application file for complete search history.

(56) References Cited

U.S. PATENT DOCUMENTS 5,724,475 A * 3/1998 Kirsten ................. 386/109
6,072,645 A 6/2000 Sprague
6,148,031 A 11/2000 Kato
6,167,186 A 12/2000 Kawasaki et al.
6,857,746 B2 * 2/2005 Dyner ..................... 353/28
2002/0149628 A1 * 10/2002 Smith et al. .............. 345/848

FOREIGN PATENT DOCUMENTS

JP 06-329960 11/1994
JP 09-102899 4/1997

OTHER PUBLICATIONS

Brochure—Ikegami—DNA Camera System with Digital Disk Recorder—Editcam2 DNS-21W/201W.

* cited by examiner

*Primary Examiner*—Andy S Rao
(74) *Attorney, Agent, or Firm*—Gerald E. Hespos; Anthony J. Casella

(57) ABSTRACT

An optical observation apparatus includes: an optical system which produces an image of an object being observed and a video device (7) for recording the image and producing an image signal. The video device (7) includes a first memory (71) for temporarily storing the image signal, a second memory (73) in data communication (77) with the first memory (71), and a control device (75) in communication (76A, 76B) with both memories (71, 73) for controlling the storage procedure in the first memory and data transfer from the first to the second memory. The control device (75) controls the storage procedure and the data transfer so that overwriting of such data already stored for a given period of time in the first memory (71) is effected and that transfer of the content of the first memory (71) to the second memory (73) takes place as a reaction to a trigger signal.

14 Claims, 4 Drawing Sheets

OPTICAL OBSERVATION APPARATUS WITH VIDEO DEVICE

BACKGROUND OF THE INVENTION

1. Field of the Invention

The invention concerns an optical observation apparatus, in particular an operation microscope, with a video device.

2. Description of the Related Art

Optical observation apparatuses such as for example microscopes, telescopes or endoscopes are used for example to view objects which are small, far away or which involve difficulties in access. In such an apparatus the objects are frequently reproduced by means of an optical system which in the simplest case can be an objective lens, in the form of an intermediate image on an image plane, referred to as the intermediate image plane. That intermediate image can be viewed on a magnified scale by means of an eyepiece.

Often however there is a wish to subject the intermediate image to electronic analysis. In addition, it is frequently desirable for the intermediate image to be made accessible not only to a single viewer but a plurality of viewers at the same time. In order to permit simultaneous viewing of the intermediate image by a plurality of viewers, the intermediate image can be recorded by a camera in analog or digital form and the recorded image can be displayed on a monitor or a plurality of monitors. In addition in particular recording the intermediate image by means of a digital camera permits electronic analysis of the intermediate image. A microscope which is combined with a video camera and in which the intermediate image is recorded by the image sensor of a video camera is described for example in JP 910 28 99 A.

While working with an optical observation apparatus which is equipped with a video device, many users want to record images of the situations being observed, for documentation purposes. Frequently however a situation arises only over a short period of time and also can no longer be reconstructed after that period of time has elapsed. For example, it is usual for surgeons to record images for scientific purposes during an operation. In that case however it frequently happens that the surgeon carrying out the procedure is too busy, during the operation, to immediately cause a situation which arises to be recorded, so that the situation can only be incompletely recorded or often cannot even be recorded at all. Frequently the situation can also no longer be reconstructed in the desired manner, for image recording thereof at a later time. Complete documentation of such situations is therefore not possible with the optical observation apparatuses in accordance with the state of the art.

Therefore the object of the present invention is to provide an improved optical observation apparatus which in particular can be an operation microscope or an endoscope and which simplifies documentation of the observed situation for the user.

SUMMARY OF THE INVENTION

An optical observation apparatus according to the invention includes: an optical system which produces an image of the object being observed and a video device for recording the image and for producing an image signal representative of the image. It is distinguished in that the video device includes a first memory for temporary storing the image signal, a second memory which is in data communication with the first memory, and a control device which is in control communication with both memories for controlling the storage procedure in the first memory and a data transfer from the first to the second memory. The control device is adapted to control the storage procedure and the data transfer in such a way that overwriting of such data which are stored in the first memory and which are already stored for a given period of time in the first memory is effected and that transfer of the content of the first memory to the second memory takes place as a reaction to a trigger signal. Preferably the entire content of the first memory is transferred into the second memory, but it is also possible for only a part of the memory content to be transferred into the second memory, whereby the amount of data to be transferred can be reduced, in particular when dealing with a relatively large first memory. All storage media which are suitable for recording the image signal can be used as the first or second memory. In addition the memories do not need to be physically separate memories. They can also be embodied in the form of a common physical memory which is only logically divided into a first and a second memory, that is to say in a first and a second memory region.

The configuration of the optical observation apparatus of the invention makes it possible for the object which is being observed to be continuously recorded without assistance from the user, and put into intermediate storage in the first memory. Data which have already been stored in the first memory over a predetermined period of time, for example the oldest recordings in the first memory, are in that case respectively overwritten by fresh data, for example a new recording. If now for example during an operation a situation which the surgeon conducting the procedure would like to record occurs, he can still secure the recording of the situation during the entire period of time in which it is stored in the first memory, by causing transfer preferably of the entire content of the first memory into the second memory. If the images are in intermediate storage in the first memory for example for five minutes, then the first image recorded of the situation is erased again five minutes after it was recorded. Therefore the user of the optical observation apparatus still has five remaining minutes to trigger transfer into the second memory. In particular recording of a situation which occurs only briefly can still be secured in that way even if the situation is already past.

In order to guarantee transfer of the data from the first memory to the second memory as quickly as possible, it is advantageous if the data communication between the first and second memories is designed for transmission at a high data rate. It is also advantageous if the second memory has a memory capacity which is at least twice as high as that of the first memory so that it permits the storage of a plurality of transfers from the first memory. That can increase the period of time before the second memory is full so that the optical observation apparatus is ready for use in one piece over a longer period of time, that is to say it is ready for transfer of recordings which are in intermediate storage in the first memory, to the second memory.

The duration of the operational readiness of the optical observation apparatus can be further increased if, instead of being in the form of a fixedly installed memory, the second memory is in the form of a replaceable memory. As soon as the second memory is full it is replaced. After a relatively short period of time involved in changing the second memory, regular operation of the optical observation apparatus can be continued. However, no transfer of the content of the first memory to the second memory can take place during the operation of changing the second memory. In order to permit a transfer of data even during the period of the change, it is possible to provide as a further intermediate memory a third memory whose memory capacity corresponds at least to that of the first memory. If, during the memory change procedure, the recording of a situation is to be transferred from the first memory to the second memory, the control device causes intermediate storage to firstly take place in the third memory. As soon as a fresh second memory has been fitted the control device then causes the content of the third memory to be transferred to the second memory.

The optical system of the optical observation apparatus can be a stereoscopic optical system. The image produced by the optical system then comprises two stereoscopic partial images and the video device comprises two first and two second memories, a respective one for each stereoscopic partial image. In particular the optical system for each stereoscopic partial image can include its own observation channel, wherein a first memory and a second memory are associated with each observation channel.

The video device can include as the image source both a video camera which records images in a video frequency and also a still camera, in particular with a high resolution, which records individual images only with a frequency below 10 Hz.

In a particular configuration of the invention the optical observation apparatus is an operation microscope while in an alternative embodiment it is an endoscope.

Further features, properties and advantages of the present invention are described hereinafter with reference to the accompanying drawings, by means of detailed embodiments.

DETAILED DESCRIPTION OF THE PREFERRED EMBODIMENTS

Figure 1:
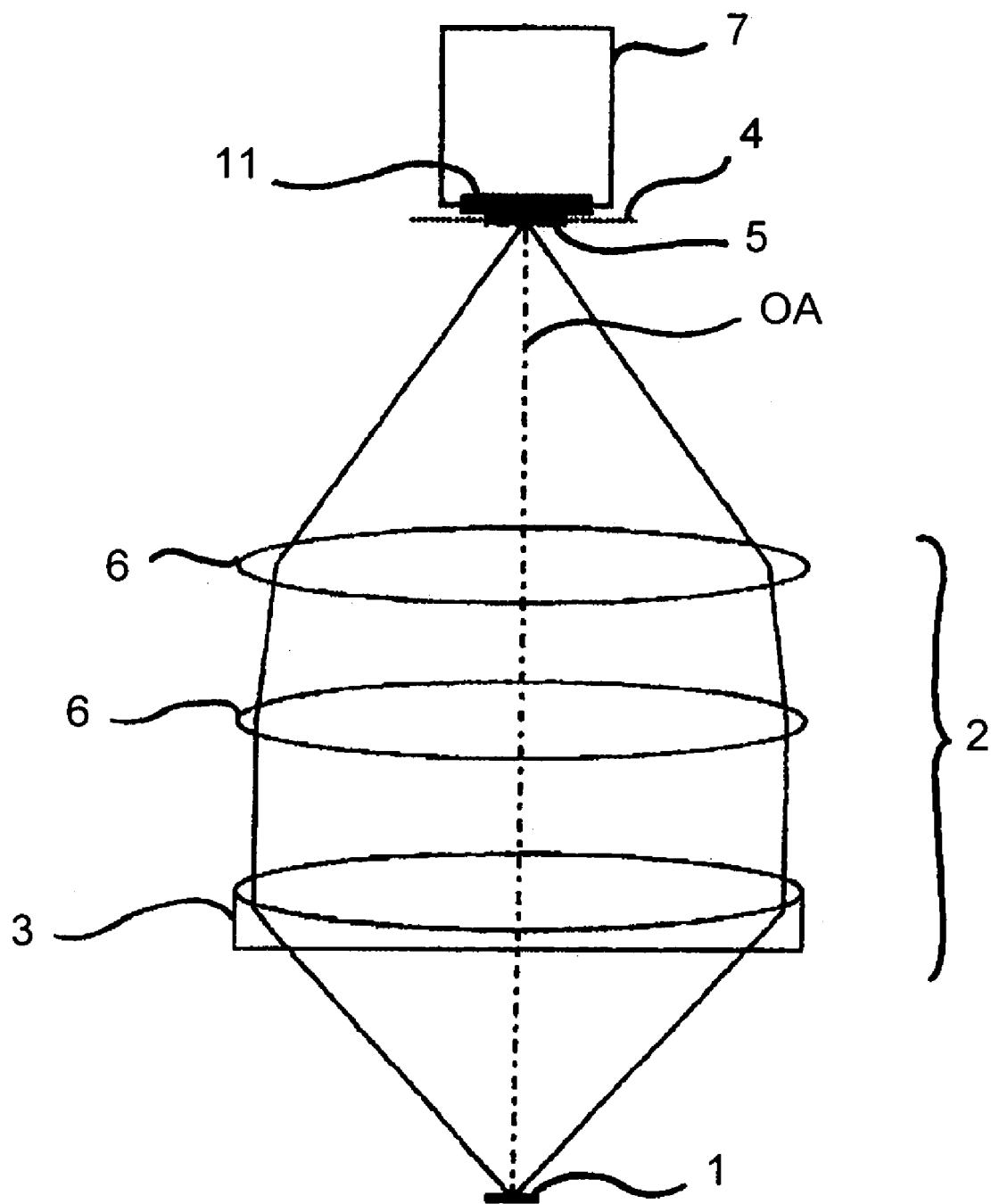
FIG. 1 shows a first embodiment of the optical observation apparatus according to the invention.

An operation microscope is diagrammatically shown in FIG. 1, as a first embodiment of the invention. The Figure represents a section taken along the optical axis OA of the operation microscope. The Figure shows an object 1 of which the image is to be produced, an optical system 2 with an achromatic objective lens 3 and further lenses 6 (not to be described in greater detail), as well as an intermediate image 5 of the object 1, which is produced by the optical system 2 in an intermediate image plane 4.

The operation microscope further includes a video device 7 with an active camera surface 11. The active camera surface 11 can either be the surface of a camera objective lens which produces the intermediate image 5 on a sensor surface, for example a CCD chip, of the video device 7, or the sensor surface itself. In the latter case, the intermediate image 5 is recorded directly with the sensor surface.

Figure 2:
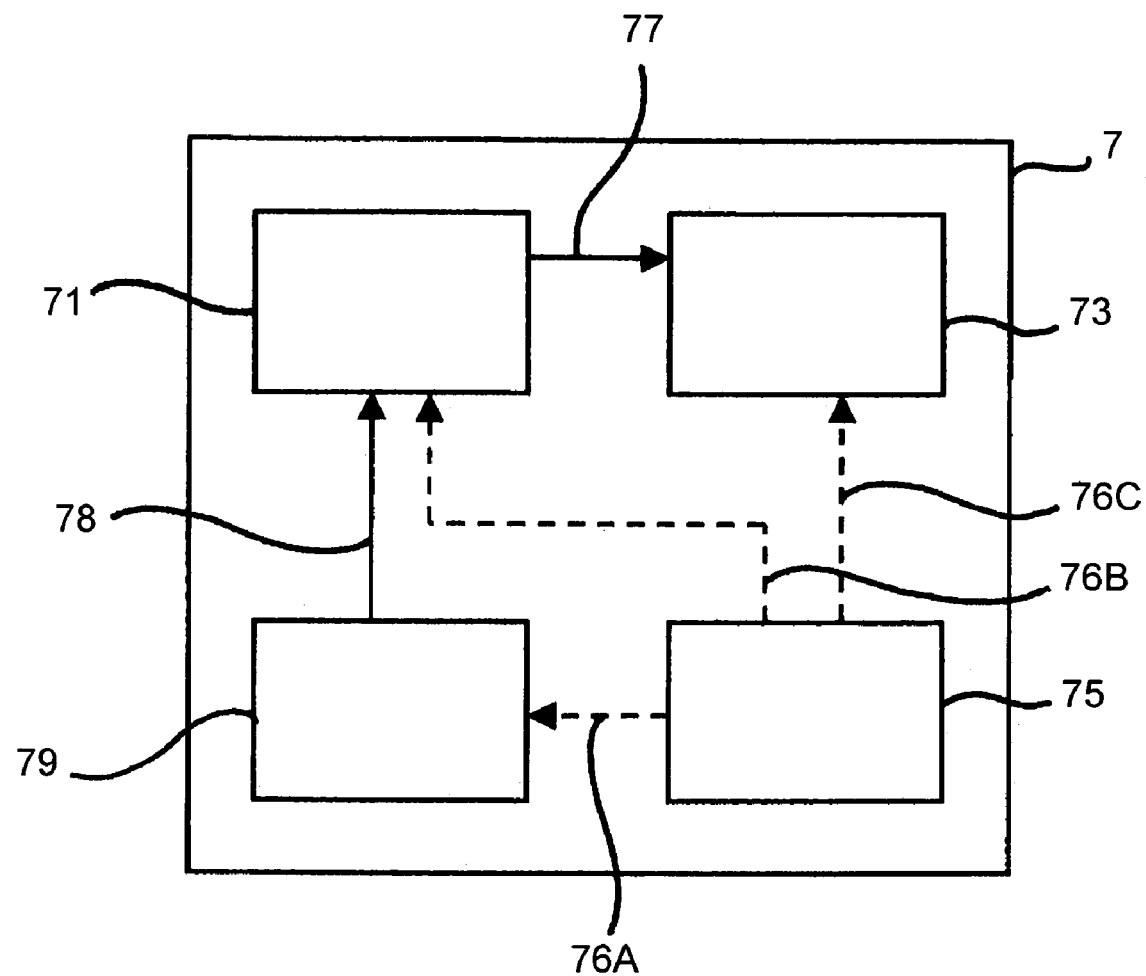
FIG. 2 shows a first embodiment of the video device.

The video device 7 is shown in FIG. 2 in the form of a simplified block circuit diagram. Elements which are not required to understand the invention have been omitted for the sake of simplicity. The video device 7 includes a first memory 71 and a second memory 73. The two memories 71, 73 are connected together by way of a data line 77 with which data can be transferred, preferably at a high data rate, from the first memory 71 to the second memory 73. The first memory 71 is further connected by way of a further data line 78 to the sensor surface 79 of the video device 7. The image signal is transferred from the sensor surface 79 into the first memory by way of the data line 78. The video device 7 further includes a control unit 75 which is connected by way of control lines 76A, 76B and 76C to the sensor surface 79, the first memory 71 and the second memory 73.

The first memory 71 is a short-term memory in which an image recorded by the sensor surface 79 is stored for a given period of time which can be any, possibly adjustable, period of time, for example between 30 seconds and ten minutes, preferably between two and five minutes. In this case, the first memory 71 is of such a size that it can store all images which are recorded during that period of time. The second memory 73 in contrast is a long-term memory in which the stored images are not automatically overwritten by new images. Preferably the second memory 73 is of a replaceable nature so that, when it is full, that is to say when it no longer offers any storage space, a new second memory 73 can be fitted. The usual replaceable storage media such as for example floppy discs, tapes or Smart Media cards can be used as the replaceable second memory 73. In addition the second memory 73 is further preferably of such a size that it can store a multiple of the content of the first memory 71.

Control of the video device is effected in such a way that, during operation of the optical observation apparatus, the image data recorded by the sensor surface 79 are continuously transferred to the first memory 71 by way of the control line 78. When that happens, in each case the oldest image data stored in the first memory 71 are overwritten by freshly recorded image data. Now, by way of a trigger button or other suitable trigger element (not shown), the user can cause the control unit 75 to output control signals by way of the control lines 76B and 76C, to the first and second memories 71, 73, which cause the entire content of the first memory 71 to be transferred to the second memory 73.

If the video device is of such a design that only a part of the content of the first memory 71 is transferred to the second memory 73, the arrangement may include a device for setting or selecting that part of the memory content, which is transferred to the second memory 73 in response to actuation of the trigger button. If the duration of storage in the first memory 71 is sufficiently long, selection of the part of the memory content which is to be transferred can be effected subsequently, that is to say after recording of the image data and storage thereof in the first memory 71, but before the erasure thereof from the first memory 71, which is caused by the passage of time. If in contrast the image data are only stored in the first memory 71 over a relatively short period of time before they are erased again so that there is no time remaining for subsequent selection, selection is preferably effected automatically on the basis of a pre-setting implemented prior to the commencement of use of the optical observation apparatus.

After the end of use of the optical observation apparatus or after removal of the second memory 73 the images stored in the second memory 73 can be transferred for the purposes of archiving onto a further storage medium, for example a magnetic tape, a CD or a DVD. Prior to the next use of the second memory 73, its memory content is then erased. By means of a suitable control routine, it is also possible for the content of the second memory 73 to be read out, in on-going operation of the optical observation apparatus, so that there is no need to effect a change in the second memory 73.

The two memories permit subsequent storage of a situation in the form of an image or an image sequence. If for example a surgeon who is working with an apparatus according to the invention wishes to store an image or an image sequence, he triggers transfer of the content of the first memory into the second memory. He can also still trigger transfer after the situation has occurred and possibly even still after the situation is past. That is possible as the image or images of the situation are stored in the short-term memory at any event for the given period of time without activity in that respect on the part of the surgeon and is or are kept in readiness for transfer into the long-term memory. The surgeon therefore has time firstly to bring to a close his other and more important tasks, for example a step in the surgical operation procedure, before he triggers transfer into the long-term memory.

Figure 3:
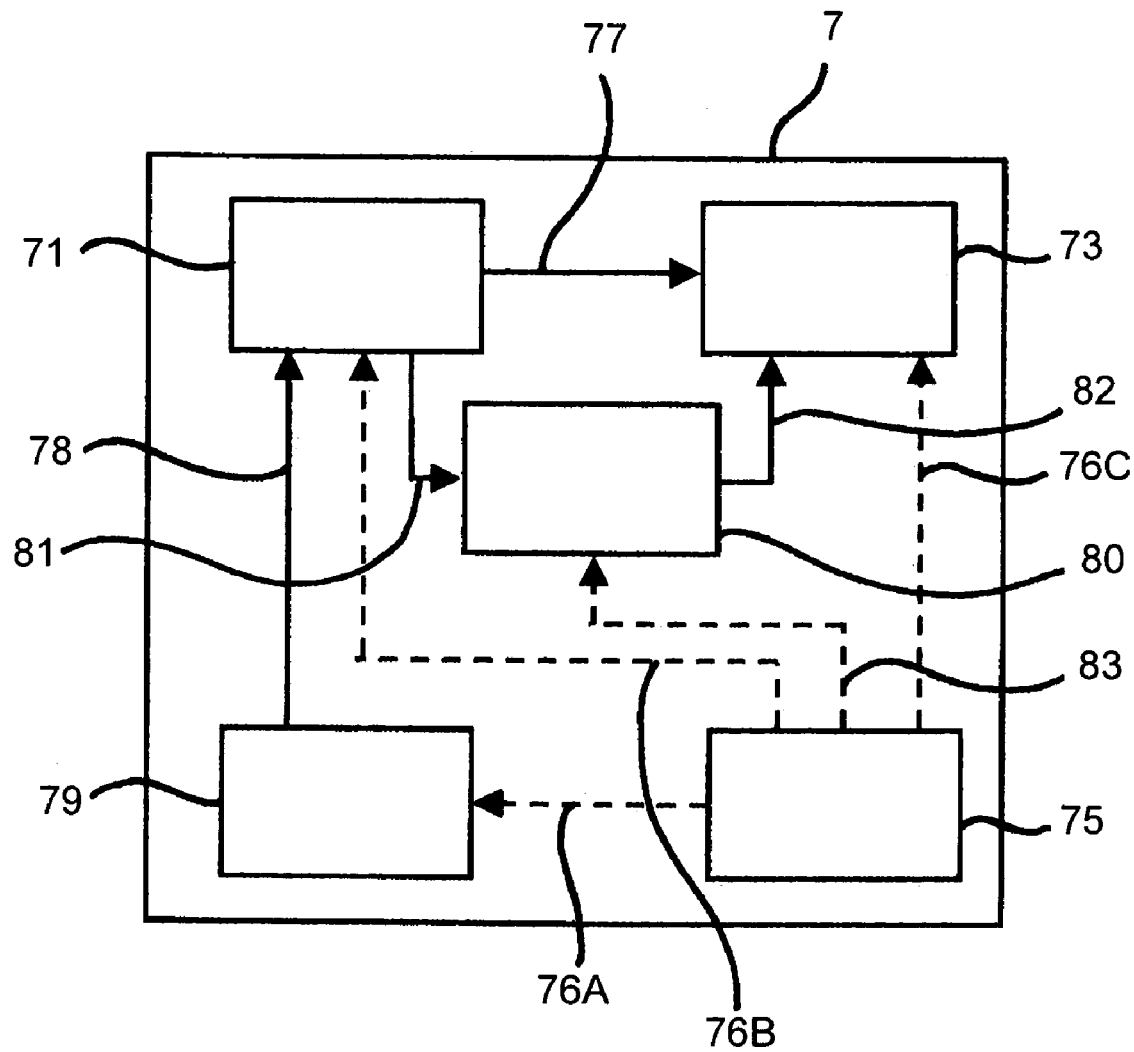
FIG. 3 shows a second embodiment of the video device.

A particular configuration of the video device with a replaceable second memory is shown in the form of a block circuit diagram in FIG. 3. The illustrated embodiment differs from that shown in FIG. 2 only insofar as there is a third memory 80, in addition to the first memory 71 and the second memory 73. The third memory 80 is connected by way of data lines 81 and 82 both to the first and also to the second memory and has a storage capacity which corresponds at least to the storage capacity of the first memory 71. In addition it is connected by way of a control line 83 to the control unit 75. In other respects the configuration shown in FIG. 3 does not differ from that shown in FIG. 2.

In the usual recording mode of the optical observation apparatus the third memory 80 does not perform any function. Image data from the first memory 71 are written directly to the second memory 73 by way of the data line 77 as a reaction to a trigger signal. The situation is different if the trigger button is pressed while a change of the second memory 73 is taking place, that is to say if no second memory 73 is available for storing the data transferred from the first memory. In that case, by way of the control lines 76B and 83, the control device 75 sends the first memory 71 and the third memory 80 control signals which cause the content of the first memory 71 to be transferred to the third memory 80 by way of the data line 81, instead of to the second memory 73. As soon as a second memory 73 with adequate free storage capacity has been fitted into the video device 7 again, the control device 75 delivers control signals to the second memory 73 and the third memory 80, and those control signals cause the image data transferred from the first memory 71 to the third memory 80 to be forwarded to the second memory 73.

Figure 4:
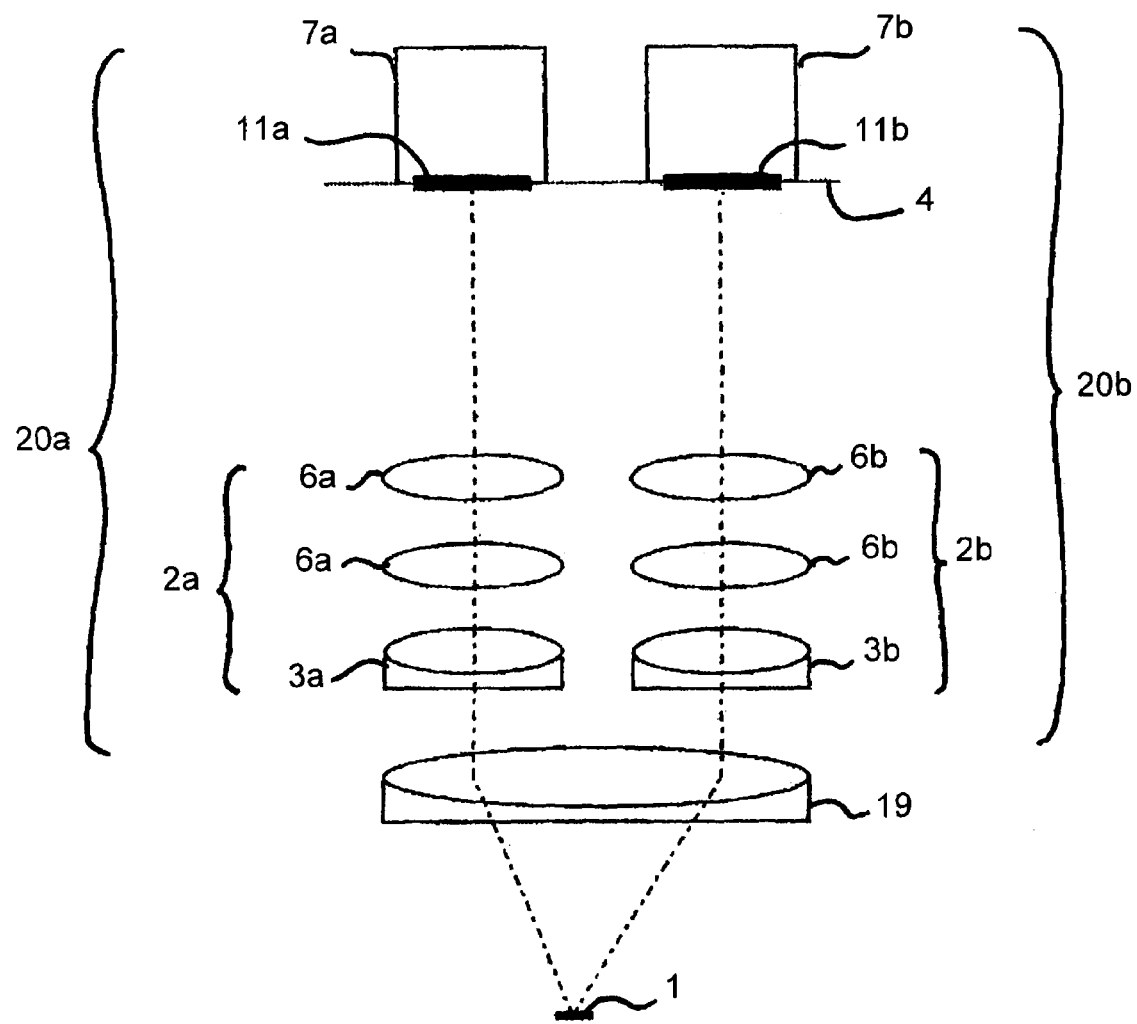
FIG. 4 shows a second embodiment of the optical observation apparatus according to the invention.

FIG. 4 diagrammatically shows a further embodiment of the optical observation apparatus according to the invention, in the form of a stereoscopic operation microscope in which a video device according to the invention is used. Two partial images which represent the object 1 being viewed, from different angles of view, are produced in a stereoscopic microscope.

FIG. 4, like FIG. 1, represents a view in section taken along the optical axis of the operation microscope. The stereoscopic operation microscope includes two observation channels 20a and 20b which each include an optical system 2a, 2b with an achromatic objective lens 3a, 3b and further lenses 6a, 6b (not to be described in greater detail here). The image of the object 1 is produced in an intermediate image plane 4, by the optical systems 2a and 2b. A common achromatic objective lens 19 is connected upstream of the two observation channels 20a, 20b.

For the purposes of recording the stereoscopic partial images, each observation channel 20a, 20b includes its own video device 7a, 7b, control of the two video devices taking place synchronously. The video devices 7a, 7b used can be video devices as have been described with reference to FIGS. 2 and 3. Alternatively it is also possible to use a common video device for both observation channels 20a, 20b. In addition, the stereoscopic operation microscope can also be designed in such a way that there is only one observation channel and the stereoscopic partial images are produced by that observation channel alternately in respect of time. It will be appreciated that, in that case, there only needs to be one video device.

What is claimed is:

1. An optical observation apparatus including:
   an optical system (2) which produces an image of the object (1) being observed, and a video device (7) for recording the image and for producing an image signal representative of the image,
   characterised in that
   the video device (7) includes a first memory (71) for temporary storage of the image signal, a replaceable second memory (73) in data communication (77) with the first memory (71), and a control device (75) in control communication (76B, 76C) with both memories (71, 73) for controlling the storage procedure and data transfer from the first to the second memory, wherein the control device is adapted for controlling the storage procedure for the first memory in such a way that the image signal is stored over a predetermined period of time and an oldest image signal is continuously overwritten by a fresh image signal, and that transfer of at least a portion of content of the first memory (71) to the second memory (73) takes place as a reaction to a trigger signal; and
   a third memory (80) which is in data communication (81, 82) both with the first memory (71) and also with the second memory (73) and in signal communication (83) with the control device (75), wherein the at least a portion of content of the first memory is transferred to the third memory as a reaction to the generated trigger signal while the second memory is being replaced.

2. An optical observation apparatus according to claim 1 characterised in that the data communication (77) between the first and second memories is designed for transfer at a high data rate.

3. An optical observation apparatus according to claim 1 characterised in that the second memory (73) has a memory capacity which is at least astwice as high as that of the first memory (71).

4. An optical observation apparatus according to claim 1 characterised in that the optical system (2a, 2b) is a stereoscopic optical system, that the image produced by the optical system (2a, 2b) includes two stereoscopic partial images and that the video device includes two first and two second memories, a respective one for each stereoscopic partial image.

5. An optical observation apparatus according to claim 4 charcterised in that the optical system for each stereoscopic partial image includes its own observation channel (20a, 20b) and that a first memory and a second memory are associated with each observation channel (20a, 20b).

6. An optical observation apparatus according to claim 1 characterised in that the video device (7) includes a still camera.

7. An optical observation apparatus according to claim 1 characterised in that it is in the form of an operation microscope or an endoscope.

8. An operation microscope including:
   an optical system (2) which produces an image of the object (1) being observed during a surgical operation, and a video device (7) for recording the image and for producing an image signal representative of the image,
   characterised in that
   the video device (7) includes a first memory (71) for temporary storage of the image signal, a second memory (73) in data communication (77) with the first memory (71), and a control device (75) in control communication (76B, 76C) with both memories (71, 73) for controlling the storage procedure and data transfer from the first to the second memory, wherein the control device is adapted for controlling the storage procedure for the first memory in such a way that the image signal is stored over a predetermined period of time and an oldest image signal is continuously overwritten by a fresh image signal, and that transfer of at least a portion of content of the first memory (71) to the second memory (73) takes place as a reaction to a trigger signal generated in response to an observable situation of the surgical operation, wherein the optical system and video device are disposed in an optical, longitudinal axis.

9. An optical observation apparatus including:

a stereoscopic optical system which produces two stereoscopic partial images of the object being observed, the optical system for each stereoscopic partial image includes its own observation channel, wherein each observation channel includes a video device for recording the stereoscopic partial image and for producing an image signal representative of the stereoscopic partial image, characterised in that each video device includes a first memory for temporary storage of the image signal, a second memory in data communication with the first memory, and a control device in control communication with both memories for controlling the storage procedure and data transfer from the first to the second memory, wherein the control device is adapted for controlling the storage procedure for the first memory in such a way that the image signal is stored over a predetermined period of time and an oldest image signal is continuously overwritten by a fresh image signal, and that transfer of at least a portion of content of the first memory to the second memory takes place as a reaction to a trigger signal.

10. A method for recording images of an object in an optical observation apparatus during a surgical operation, the method comprising:

producing an image of the object being observed during the surgical operation;

recording the image and producing an image signal representative of the image;

temporarily storing the image signal in a first memory and controlling the storage procedure for the first memory in such a way that the image signal is stored over a predetermined period of time and an oldest image signal is continuously overwritten by a fresh image signal;

generating a trigger signal in response to an observable situation of the surgical operation; and transferring at least a portion of content of the first memory to the second memory as a reaction to the generated trigger signal, wherein the portion of content of the first memory includes image signals representative of the observable situation.

11. The method as in claim 10, wherein the observable situation occurs at a first point in time and the generating of the trigger signal occurs at a later second point in time.

12. The method as in claim 11, further comprising selecting a predetermined portion of the first memory to be transferred after generating the trigger signal.

13. The method as in claim 10, wherein the second memory is replaceable, further comprising:

transferring the at least a portion of content of the first memory to a third memory as a reaction to the generated trigger signal while the second memory is being replaced.

14. The method as in claim 13, further comprising transferring the contents of the third memory to the second memory upon the second memory being replaced in the optical observation apparatus.

\* \* \* \* \*